(12) United States Patent
Schwindt et al.

(10) Patent No.: US 12,371,053 B2
(45) Date of Patent: Jul. 29, 2025

(54) USING STATIC GRID MAP TO CROSS-CHECK DYNAMIC OBJECTS

(71) Applicant: Robert Bosch GmbH, Stuttgart (DE)

(72) Inventors: Oliver F. Schwindt, Sunnyvale, CA (US); Stephan Reuter, Bavaria (DE); Christos Zalidis, Mountain View, CA (US); Tobias Berling, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 18/064,083

(22) Filed: Dec. 9, 2022

(65) Prior Publication Data

US 2024/0190462 A1 Jun. 13, 2024

(51) Int. Cl.
*B60W 60/00* (2020.01)

(52) U.S. Cl.
CPC ....... *B60W 60/001* (2020.02); *B60W 2554/40* (2020.02)

(58) Field of Classification Search
CPC .............. B60W 60/00; B60W 60/001; B60W 2554/00; B60W 2554/40
USPC .......................................................... 701/1
See application file for complete search history.

(56) References Cited

U.S. PATENT DOCUMENTS

| | | | |
|---|---|---|---|
| 9,996,944 B2 | 6/2018 | Aghamohammadi et al. | |
| 10,152,056 B2 | 12/2018 | Rohde et al. | |
| 10,296,001 B2 | 5/2019 | Smith et al. | |
| 10,445,928 B2 | 10/2019 | Nehmadi et al. | |
| 10,532,740 B2 | 1/2020 | Sorstedt et al. | |
| 10,955,855 B1 | 3/2021 | Tran | |
| 11,158,120 B1 * | 10/2021 | Jespersen | G06T 7/50 |
| 11,163,309 B2 | 11/2021 | Ta et al. | |
| 11,315,317 B2 | 4/2022 | Yu et al. | |
| 2018/0173232 A1 | 6/2018 | Schwindt et al. | |
| 2020/0209857 A1 | 7/2020 | Djuric et al. | |
| 2020/0225622 A1 | 7/2020 | Buerkle et al. | |
| 2020/0249326 A1 | 8/2020 | Bhaskaran et al. | |

(Continued)

FOREIGN PATENT DOCUMENTS

DE 102019129463 A1 * 5/2021
DE 102020119954 A1 * 2/2022

*Primary Examiner* — Khoi H Tran
*Assistant Examiner* — Sarah A Tran
(74) *Attorney, Agent, or Firm* — Michael Best & Friedrich LLP

(57) ABSTRACT

Systems and methods for controlling an autonomous vehicle. One system includes an electronic processor and a sensor configured to detect a dynamic object in an environment. The electronic processor is configured to generate a dynamic object list including dynamic object information associated with the detected dynamic object. The electronic processor is also configured to receive a static occupancy grid including a plurality of cells storing occupancy information and occupancy probabilities associated with a static object in the environment. The electronic processor is further configured to superimpose the dynamic object information on the static occupancy grid, determine an overlap of the detected dynamic object and the static object, determine a dynamic object existence probability associated with the detected dynamic object based on the overlap, and classify the detected dynamic object as a ghost object based on the dynamic object existence probability.

18 Claims, 4 Drawing Sheets

(56) References Cited

U.S. PATENT DOCUMENTS

| | | |
|---|---|---|
| 2020/0283028 A1 | 9/2020 | Oba |
| 2020/0334887 A1 | 10/2020 | Salfity et al. |
| 2020/0370920 A1 | 11/2020 | Ahmed et al. |
| 2021/0101624 A1 | 4/2021 | Philbin et al. |
| 2021/0131823 A1 | 5/2021 | Giorgio et al. |
| 2021/0323572 A1 | 10/2021 | He et al. |
| 2021/0327128 A1* | 10/2021 | Yu .......................... G06T 19/20 |
| 2021/0342599 A1 | 11/2021 | Walls et al. |
| 2021/0347378 A1 | 11/2021 | Nabatchian et al. |
| 2022/0194412 A1 | 6/2022 | Zhang et al. |
| 2023/0145218 A1 | 5/2023 | Murray et al. |
| 2023/0206755 A1 | 6/2023 | Jha et al. |

* cited by examiner

USING STATIC GRID MAP TO CROSS-CHECK DYNAMIC OBJECTS

FIELD

Embodiments, examples, and aspects described herein relate to, among other things, systems and methods for operating an autonomous vehicle with a plurality of sensors.

SUMMARY

Ghost objects are non-real static or dynamic features that do not exist in the environment and are important to properly detect in autonomous vehicle systems. Ghost dynamic objects are often detected on extended static infrastructure, such as, for example, concrete walls, guardrails, or curbs. Sensor systems in an autonomous vehicle may erroneously identify such static infrastructure as moving. Ghost static objects may also be detected when a real dynamic feature is erroneously identified by vehicle sensor systems as a static feature. As the real dynamic object moves through the environment, the sensors may continuously detect ghost static objects (e.g., ghost occupancy trails) behind the real dynamic object. Examples herein provide systems and methods for identifying and handling ghost objects in autonomous vehicle systems.

One example provides a system for operating an autonomous vehicle. The system includes a sensor configured to output sensor data representative of a detected dynamic object, and an electronic processor configured to: receive a static occupancy grid, the static occupancy grid including a plurality of cells, a subset of the cells storing occupancy information and occupancy probabilities associated with a static object in the environment, generate a dynamic object list, the dynamic object list including dynamic object information associated with the detected dynamic object and a respective position of the detected dynamic object in the environment, superimpose a representation of the detected dynamic object on the static occupancy grid based on the dynamic object information, generate a dynamic object perimeter based on a shape of the detected dynamic object as superimposed on the static occupancy grid, determine, based on the dynamic object perimeter, an overlap of the detected dynamic object and the static object represented in the static occupancy grid, determine a dynamic object existence probability associated with the detected dynamic object based at least on the overlap, classify the detected dynamic object as a ghost dynamic object in response to determining the dynamic object existence probability is less than a threshold, and control vehicle motion based on the classification of the detected dynamic object as a ghost dynamic object.

In some instances, the electronic processor is further configured to, in response to the dynamic object existence probability being greater than the threshold, classify the static object as a ghost static object.

In some instances, the electronic processor is configured to determine the dynamic object existence probability by determining a modality of the sensor, and determining the dynamic object existence probability based on the modality of the sensor.

In some instances, the electronic processor is configured to determine the dynamic object existence probability by determining a size of the detected dynamic object, and determining the dynamic object existence probability based on the size of the detected dynamic object.

In some instances, the system includes a plurality of sensors configured to detect the dynamic object, and the electronic processor is configured to determine the dynamic object existence probability by determining a number of sensors that detected the dynamic object, and determining the dynamic object existence probability based on the number of sensors that detected the dynamic object.

In some instances, the electronic processor is configured to determine the dynamic object existence probability by tracking the detected dynamic object over a period of time, determining a plurality of dynamic object existence probabilities over the period of time, and determining a historical dynamic object existence probability associated with the detected dynamic object based on the plurality of dynamic object existence probabilities.

In some instances, the electronic processor is configured to determine the dynamic object existence probability by determining a direction of motion of the detected dynamic object, determining a plurality of dynamic object existence probabilities, each associated with a cell of the static occupancy grid included in the overlap, and applying a weight to a subset of the plurality of dynamic object existence probabilities based on the direction of motion.

In some instances, the electronic processor is configured to superimpose the dynamic object information on the static occupancy grid by predicting or retrodicting the dynamic object information such that a time stamp associated with the dynamic object information matches a time stamp associated with the static occupancy grid, and spatially transforming the dynamic object information.

In some instances, the plurality of cells of the static occupancy grid are voxels, and the dynamic object perimeter is a 3D bounding box.

Another example provides a method for operating an autonomous vehicle. The method includes outputting, with a sensor, sensor data representative of a detected dynamic object; receiving, with an electronic processor, a static occupancy grid, the static occupancy grid including a plurality of cells, a subset of the cells storing occupancy information and occupancy probabilities associated with a static object in the environment; generating a dynamic object list, the dynamic object list including dynamic object information associated with the detected dynamic object and a respective position of the detected dynamic object in the environment; superimposing a representation of the detected dynamic object on the static occupancy grid based on the dynamic object information; generating a dynamic object perimeter based on a shape of the detected dynamic object as superimposed on the static occupancy grid; determining, based on the dynamic object perimeter, an overlap of the detected dynamic object and the static object represented in the static occupancy grid; determining a dynamic object existence probability associated with the detected dynamic object based at least on the overlap; classifying the detected dynamic object as a ghost dynamic object in response to determining the dynamic object existence probability is less than a threshold; and controlling vehicle motion based on the classification of the detected dynamic object as a ghost dynamic object.

In some instances, the method includes, in response to the dynamic object existence probability being greater than the threshold, classifying the static object as a ghost static object.

In some instances, determining the dynamic object existence probability includes determining a modality of the sensor, and determining the dynamic object existence probability based on the modality of the sensor.

In some instances, determining the dynamic object existence probability includes determining a size of the detected dynamic object, and determining the dynamic object existence probability based on the size of the detected dynamic object.

In some instances, the method includes detecting the dynamic object with a plurality of sensors, and determining the dynamic object existence probability includes determining a number of sensors that detected the dynamic object, and determining the dynamic object existence probability based on the number of sensors that detected the dynamic object.

In some instances, determining the dynamic object existence probability includes tracking the detected dynamic object over a period of time, determining a plurality of dynamic object existence probabilities over the period of time, and determining a historical dynamic object existence probability associated with the detected dynamic object based on the plurality of dynamic object existence probabilities.

In some instances, determining the dynamic object existence probability includes determining a direction of motion of the detected dynamic object, determining a plurality of dynamic object existence probabilities, each associated with a cell of the static occupancy grid included in the overlap, and applying a weight to a subset of the plurality of dynamic object existence probabilities based on the direction of motion.

In some instances, superimposing the dynamic object information on the static occupancy grid includes predicting or retrodicting the dynamic object information such that a time stamp associated with the dynamic object information matches a time stamp associated with the static occupancy grid, and spatially transforming the dynamic object information.

In some instances, the plurality of cells of the static occupancy grid are voxels, and the dynamic object perimeter is a 3D bounding box.

DETAILED DESCRIPTION

Figure 1:
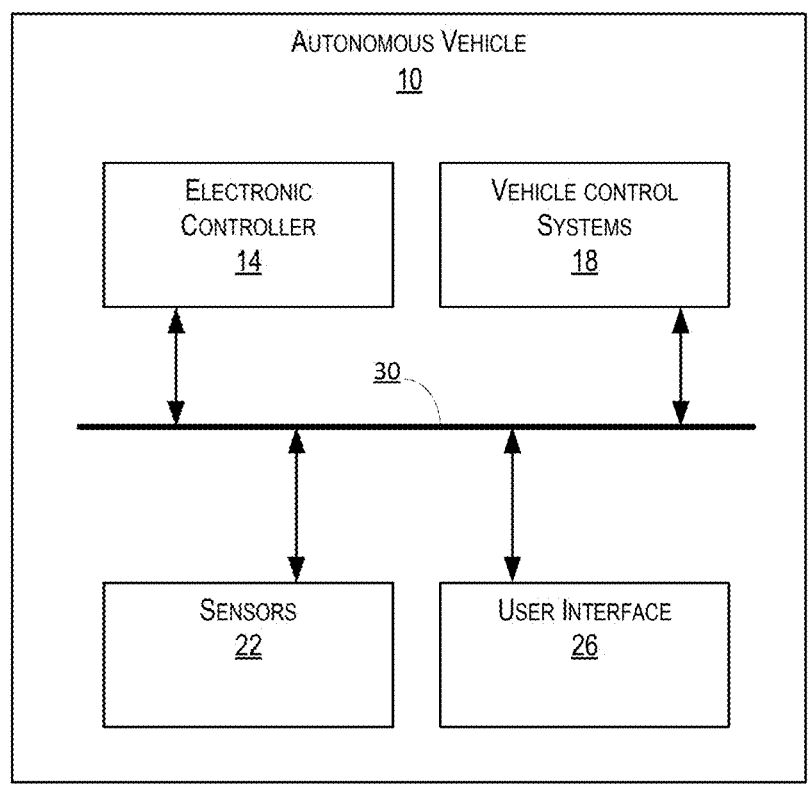
FIG. 1 illustrates an autonomous vehicle, according to some aspects.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

Autonomous vehicles and driver assistance functions may rely on occupancy grid maps, which store probabilistic information relating to features of an environment, to control vehicle movement. Occupancy grid maps include a set of cells associated with respective positions in the environment surrounding a vehicle. The cells, which may be 2D cells or 3D voxels, include occupancy information relating to static or dynamic features of the environment. For example, a subset of the cells may include occupancy information associated with a detected static object at a corresponding position in the environment. The occupancy information may include sensor measurements of the features, occupancy probabilities of corresponding positions in the environment, free-space probabilities of corresponding positions in the environment, and combinations of the same. These cells are typically initialized to an unknown state, and a degree of certainty that the cell is free or occupied is gradually incremented as one or more vehicle sensors detect and confirm features of the environment.

For example, each cell may be assigned an occupancy probability, a free-space probability, or a combination thereof. An occupancy probability is a value (for example, a value within a range of 0 to 1) representing a likelihood that a position represented by a respective cell is occupied by an object in the environment. A free-space probability is a value representing a likelihood that a position representing by a respective cell is not occupied by an object in the environment. The occupancy probabilities and free-space probabilities are not limited to numerical values between 0 and 1, and may be, for example, percentages, other numerical ranges, or other representations of probability.

Static features are stationary features of the environment. Static features include, for example, road markings, guard rails, curbs, a type of ground surface, ground elevation, buildings, sidewalks, parked vehicles, construction site equipment, trash collection bins, under-drivable structures (e.g., bridges), and other non-moving objects. Dynamic features include, for example, pedestrians, moving vehicles, animals, and other moving objects.

In some instances, the occupancy grid maps are multi-layer grid maps, where each layer stores information relating to a type of feature. For example, the multi-layer grid map may include a static occupancy grid, a dynamic occupancy grid, or a combination thereof. In some instances, the multi-layer grid further includes a ground surface grid and a road marking grid.

In some instances, sensor systems erroneously detect ghost objects. Ghost objects are non-real static or dynamic features which do not exist in the environment surrounding the autonomous vehicle. Ghost dynamic objects are often detected on extended static infrastructure, such as, for example, concrete walls, guardrails, or curbs. Sensor systems in an autonomous vehicle may erroneously identify such static infrastructure as moving. Ghost static objects may also be detected when a real dynamic feature is erroneously identified by the sensor systems as a static feature. As the real dynamic object moves through the environment, the sensors may continuously detect ghost static objects (e.g., ghost occupancy trails) behind the real dynamic object. Examples herein provide systems and methods for identifying and handling ghost objects in autonomous vehicle systems.

FIG. 1 schematically illustrates an autonomous vehicle 10. In the illustrated example, the autonomous vehicle 10 includes an electronic controller 14, vehicle control systems 18, a plurality of sensors 22, and a user interface 26. The components of the autonomous vehicle 10, along with other various modules and components are electrically and communicatively coupled to each other via direct connections or by or through one or more control or data buses (for example, the bus 30), which enable communication therebetween. The use of control and data buses for the interconnection between, and communication among, the various modules and components would be known to a person skilled in the art in view of the invention described herein. In some instances, the bus 30 is a Controller Area Network (CAN™) bus. In some instances, the bus 30 is an automotive Ethernet™, a FlexRay™ communications bus, or another suitable bus. In alternative instances, some or all of the components of the autonomous vehicle 10 may be communicatively coupled using suitable wireless modalities (for example, Bluetooth™ or near field communication connections).

The electronic controller 14 (described in greater detail below with respect to FIG. 2) communicates with vehicle control systems 18 and the sensors 22. The electronic controller 14 may receive sensor data from the sensors 22 and determine control commands for the autonomous vehicle 10. The electronic controller 14 transmits the control commands to, among other things, the vehicle control systems 18 to operate or assist in operating the autonomous vehicle 10 (for example, by generating braking signals, acceleration signals, steering signals). In some instances, the electronic controller 14 is part of one or more vehicle controllers that implement autonomous or partially autonomous control of the autonomous vehicle 10.

The vehicle control systems 18 may include controllers, actuators, and the like for controlling aspects of the operation of the autonomous vehicle 10 (for example, acceleration, braking, shifting gears, and the like). The vehicle control systems 18 communicate with the electronic controller 14 via the bus 30.

The sensors 22 determine one or more attributes of the autonomous vehicle 10 and its surrounding environment and communicate information regarding those attributes to the other components of the autonomous vehicle 10 using, for example, messages transmitted on the bus 30. The sensors 22 may include, for example, vehicle control sensors (for example, sensors that detect accelerator pedal position and brake pedal position, wheel speed sensors, vehicle speed sensors, yaw, pitch, and roll sensors, force sensors, and vehicle proximity sensors (for example, ultrasonic). In some instances, the sensors 22 include one or more cameras or other imaging devices configured to capture one or more images of the environment surrounding the autonomous vehicle 10. Radar and LiDAR sensors may also be used. The sensors 22 may each include a processor and be configured to process raw sensor data before outputting sensor information to other components of the autonomous vehicle 10, such as the electronic controller 14.

In some instances, the electronic controller 14 controls aspects of the autonomous vehicle 10 based on commands received from the user interface 26. The user interface 26 provides an interface between the components of the autonomous vehicle 10 and an occupant (for example, a driver) of the autonomous vehicle 10. The user interface 26 is configured to receive input from the driver, receive indications of vehicle status from the system's controllers (for example, the electronic controller 14), and provide information to the driver based on the received indications. The user interface 26 provides visual output, such as, for example, graphical indicators (for example, fixed or animated icons), lights, colors, text, images, combinations of the foregoing, and the like. The user interface 26 includes a suitable display mechanism for displaying the visual output, such as, for example, a liquid crystal display (LCD) touch screen, or an organic light-emitting diode (OLED) touch screen), or other suitable mechanisms. In some instances, the user interface 26 displays a graphical user interface (GUI) (for example, generated by the electronic controller 14 and presented on a display screen) that enables a driver or passenger to interact with the autonomous vehicle 10. The user interface 26 may also provide audio output to the driver via a chime, buzzer, speaker, or other suitable device included in the user interface 26 or separate from the user interface 26. In some instances, user interface 26 provides haptic outputs to the driver by vibrating one or more vehicle components (for example, the vehicle's steering wheel and the seats), for example, using a vibration motor. In some instances, user interface 26 provides a combination of visual, audio, and haptic outputs.

Figure 2:
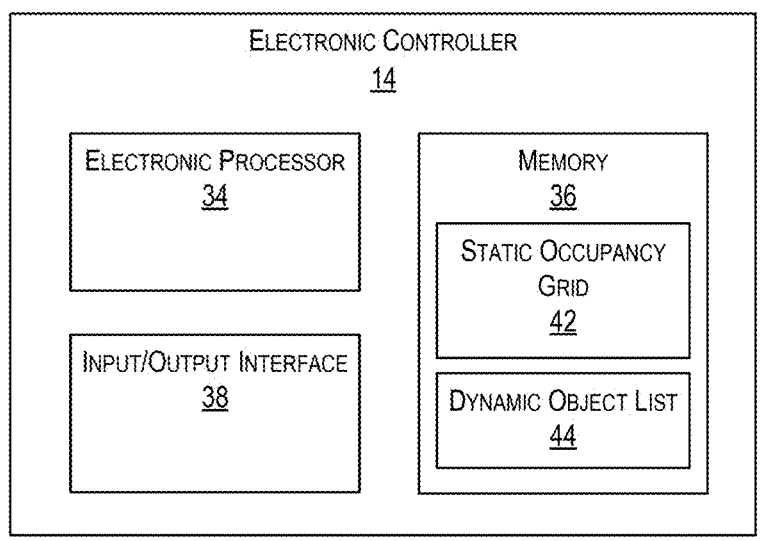
FIG. 2 illustrates an electronic controller for an autonomous vehicle, according to some aspects.

FIG. 2 illustrates an example of the electronic controller 14, which includes an electronic processor 34 (for example, a microprocessor, application specific integrated circuit, etc.), a memory 36, and an input/output interface 38. The memory 36 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 34 is coupled to the memory 36 and the input/output interface 38. The electronic processor 34 sends and receives information (for example, from the memory 36 and/or the input/output interface 38) and processes the information by executing one or more software instructions or modules, capable of being stored in the memory 36, or another non-transitory computer readable medium. The software can include firmware, one or more applications, program data, filters, rules, one or more program modules, and other executable instructions. The electronic processor 34 is configured to retrieve from the memory 36 and execute, among other things, software for performing methods as described herein. In the example illustrated, the memory 36 stores, among other things, a static occupancy grid 42 storing information associated with stationary features of the environment surrounding the autonomous vehicle 10. The memory also stores a dynamic object list 44. The dynamic object list 44 stores information associated with dynamic objects in the environment surrounding the autonomous vehicle 10, such as, for example, a number of dynamic objects in the environment, positions of the dynamic objects, occupancy probabilities associated with the dynamic objects, type identifiers of the dynamic objects, and the like. The input/output interface 38 transmits and receives information from devices external to the electronic controller 14 (for example, components of the autonomous vehicle 10 via the bus 30).

Figure 3:
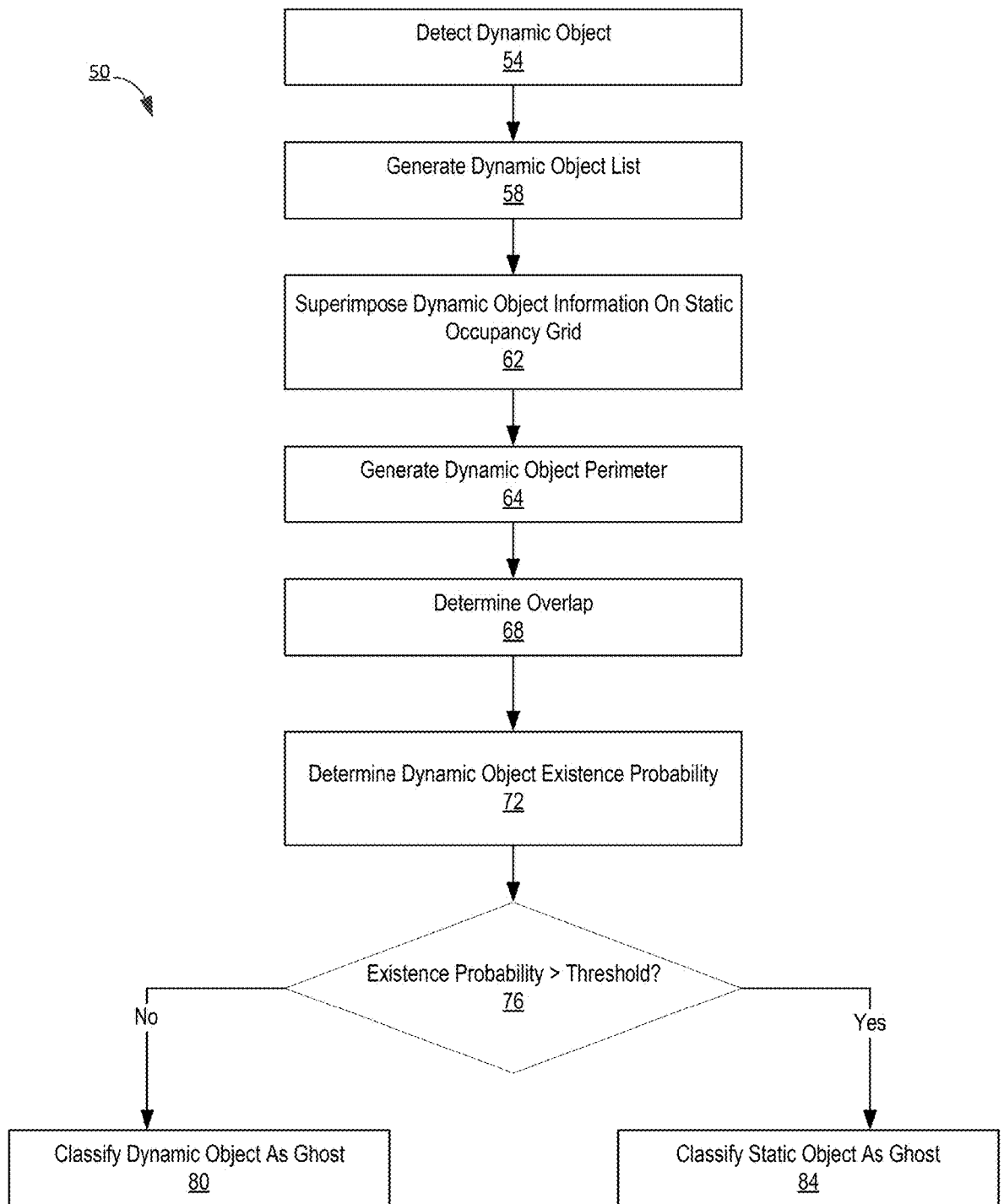
FIG. 3 illustrates a method for identifying ghost objects, according to some aspects.

FIG. 3 is a flowchart illustrating an example method 50 for identifying ghost objects. Some of the method blocks of the method 50 are described below with reference to the electronic processor 34, however, these blocks may be implemented in the autonomous vehicle 10 in any appropriate matter (for example, on the central processing unit or the graphics processing unit). Additionally, it should be understood that in some instances a "sensor" includes both sensing components and processing components (for example, a microprocessor) and, as a consequence, the sensor processes raw information or data and generates determinations. In general, whenever the term "sensor" is used it should be understood that the sensor may include both sensing and processing components and may be configured to generate data in particular formats, determinations regarding sensed phenomena, or other processed outputs.

Each block in the method 50 is illustrated once each and in a particular order, however, the blocks of the method 50 may be reordered and repeated as appropriate. Additionally, any operations in the method 50 and may be performed in parallel with each other as appropriate and as desired.

At block 54, one or more of the sensors 22 detects an object at a position in the environment surrounding the autonomous vehicle 10, and outputs sensor data to the electronic processor 34 representative of the detected object. In some examples, the sensor data identifies the detected object as a dynamic object. In other examples, the electronic processor 34 processes the sensor data to identify the object, classify the object, or both. The sensors 22, the electronic processor 34, or a combination thereof may use known techniques to classify a detected object. For example, the one or more sensors 22, the electronic processor 34, or both may be configured to use such classification techniques to determine whether a detected object is a dynamic object or a static object. Alternatively or in addition, the one or more sensors 22, the electronic processor 34, or both may be configured to determine that an object is dynamic based on changes to the detected object over time. For the sake of brevity, examples herein describe detection of a single detected object in the environment, however, it should be understood that the one or more sensors 22, the electronic processor 34, or a combination thereof may perform similar processing for any number of detected objects in the environment surrounding the autonomous vehicle 10.

At block 58, the electronic processor 34 generates a dynamic object list 44 based on the sensor data. The dynamic object list 44 includes dynamic object information associated with each detected dynamic object. For example, the dynamic object list 44 may include the respective position of each detected dynamic object in the environment, a type of dynamic object detected (e.g., a vehicle or a person), occupancy probabilities associated with the detected dynamic object, a time stamp associated with the detection of the dynamic object, or a combination thereof. It should be understood that generating a dynamic object list 44 as described herein may include creating a new list or adding a new detected dynamic object to an existing list.

In some instances, the electronic processor 34 determines a size and shape of the detected dynamic object based on the sensor data and includes the size and shape data in the dynamic object list 44. Alternatively or in addition, the sensors 22 provide, with the sensor data, the size and shape of the detected dynamic object to the electronic processor 34, which the electronic processor 34 adds to the dynamic object list 44.

In some instances, the electronic processor 34 determines a dynamic state of the detected dynamic object, such as, for example, a velocity of the detected dynamic object, an acceleration of the detected dynamic object, a direction of motion of the detected dynamic object, or a combination thereof. Alternatively or in addition, the electronic processor 34 determines a detected dynamic object type classification such as, for example, a car, a bus, a pedestrian, etc.

For each dynamic object represented within the dynamic object list 44, the electronic processor 34 performs a check to determine whether the detected object is a true dynamic object or, for example, is a ghost object. Blocks 62, 64, 68, 72, 76, 80, and 84 of the method 50 are described herein with respect to one dynamic object represented within the dynamic object list 44. However, it should be understood that the electronic processor 34 is configured to perform this portion of the method 50 for each represented object.

At block 62, the electronic processor 34 superimposes a representation of a detected dynamic object on the static occupancy grid 42 based on dynamic object information included in the dynamic object list 44. For example, the electronic processor 34 superimposes occupancy information associated with the detected dynamic object over one or more cells of the static occupancy grid 42 corresponding to the position of the detected dynamic object in the environment. The electronic processor 34 may process the detected dynamic occupancy information prior to superimposing the information on the static occupancy gird 42. For example, in some instances, the electronic processor 34 processes detected dynamic occupancy information by performing time-filtering (e.g., with a Kalman filter) of the detected dynamic object occupancy information. Alternatively or in addition, the electronic processor 34 may process the detected dynamic occupancy information by spatially transforming the detected dynamic object occupancy information over the static occupancy grid 42. Alternatively or in addition, the electronic processor 34 may predict or retrodict the detected dynamic object information such that a time stamp associated with the detected dynamic object information matches a time stamp associated with the static occupancy grid 42.

At block 64, the electronic processor 34 generates a dynamic object perimeter based on the size and shape of the detected dynamic object and overlays the perimeter on the static occupancy grid 42. The dynamic object perimeter may be a 2D bounding box, a 3D bounding box, a 2D contour, a 3D contour based on the shape of the detected dynamic object, or a combination thereof, wherein 3D perimeters may be used when the static occupancy grid includes 3D voxels.

Figure 4:
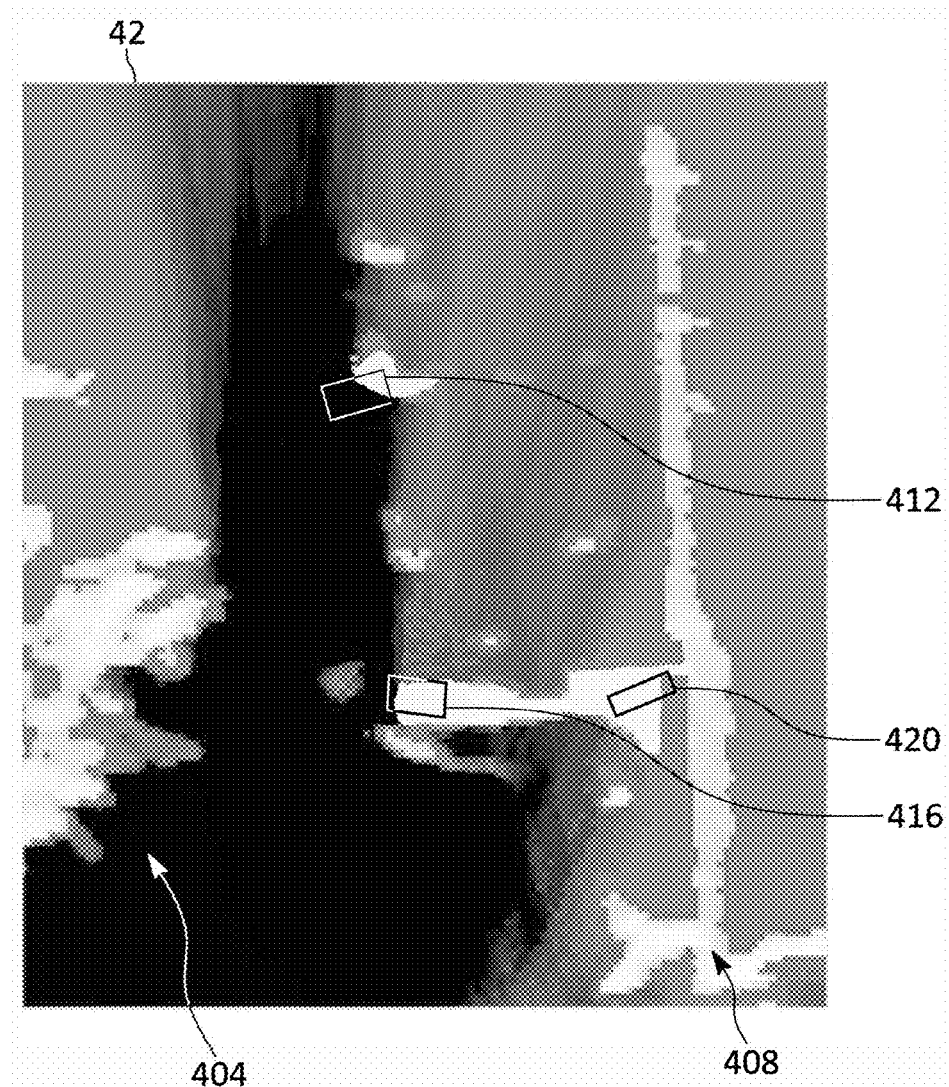
FIG. 4 illustrates a static occupancy grid, according to some aspects.

At block 68, the electronic processor 34 determines, based on the dynamic object perimeter, an overlap (if any) of the detected dynamic object and any detected static object represented in the static occupancy grid 42. When such an overlap is determined, the electronic processor 34 determines that a static object and a dynamic object are both detected at the same position in the environment. For example, FIG. 4 illustrates an example of a static occupancy grid 42 including darker areas 404 and lighter areas 408. The darker areas 404 generally represent low occupancy probabilities, which correspond to free-space (not static object detected in the positions represented by the cells). The lighter areas 408 generally represent high occupancy probabilities corresponding to detected static objects, such as, for example, road infrastructure. The electronic processor 34 may determine if a cell of the static occupancy grid 42 corresponds to one of free-space or a detected static object based on a threshold occupancy probability. In the example of FIG. 4, a first detected dynamic object 412, a second detected dynamic object 416, and a third detected dynamic 420 are superimposed on the static occupancy grid 42, each with a respective bounding box. In the illustrated example, each of the detected dynamic objects 412-420 overlap with one or more cells of a high static occupancy probability (i.e., one or more cells included in a lighter area 408 or having an occupancy probability meeting a threshold occupancy probability). In some instances, the electronic processor 34 determines whether a threshold number of cells are included in overlap and may disregard overlaps including less than the threshold number of cells.

Referring again to FIG. 3, at block 72, the electronic processor 34 determines, based on the overlap, a dynamic object existence probability associated with the detected dynamic object. The dynamic object existence probability is a value representing a likelihood that the detected dynamic object represents a real static object that exists at a position in the environment. The dynamic object existence probability may be, for example, a numerical value within a range, a percentage, or any other representation of probability. The electronic processor 34 may determine a dynamic object existence probability for one representative cell of the static occupancy grid 42 included in the overlap, such as, for example, a center cell, a perimeter cell, or the like, wherein the probability determined for the single cell is used as the dynamic object existence probability for the detected object. Alternatively or in addition, the electronic processor 34 may determine a dynamic object existence probability associated with a plurality of cells in the overlap, such as, for example, each cell in the overlap, and combine the probabilities to determine dynamic object existence probability for the detected object (e.g., based on an average, a minimum, or a maximum of the dynamic object existence probabilities associated with cells of the overlap). Various examples are described below for determining the dynamic object existence probability. The examples below may be implemented alternatively or in addition to one another to determine the dynamic object existence probability. For example, one or more of the below examples may be used to determine a dynamic object existence probability for one or cells included in the overlap, and the electronic processor 34 may be configured to combine the probability, compare each probability to one or more thresholds, or a combination thereof to determine a dynamic object existence. As one non-limiting example, the electronic processor 34 may implement multiple of the examples noted below and if any one of the examples indicates that the detected object is a ghost object, may classify the detected object accordingly. As another non-limiting example, the electronic processor 34 may implement multiple of the examples noted below and may combine the outputs (including, for example, assigning weights to individual outputs) from each example to make a final determination of a dynamic object existence probability for the detected object and classify the object accordingly.

As one example, the dynamic object existence probability is based on the occupancy probability associated with the detected static object. For example, when the occupancy probability associated with the detected static object exceeds a threshold occupancy probability indicating a high likelihood that a real static object exists at the position in the environment, the electronic processor 34 determines that it is unlikely that the detected dynamic object represents a real dynamic object. Accordingly, in this instance, the electronic processor 34 determines that the dynamic object existence probability is lower than if the occupancy probability associated with detected static object did not exceed a threshold occupancy probability. A lower dynamic object existence probability indicates that it is more likely that the detected dynamic object is actually a real static object.

As another example, the electronic processor 34 is configured to determine a modality of the sensor 22 (e.g., radar, lidar, video, ultrasound) that detected the dynamic object and determine the dynamic object existence probability based on the modality of the sensor 22. For example, when a sensor that has poor resolution certain distances or angles detects the dynamic object, the electronic processor 34 increases or decreases the dynamic object existence probability based on the distance, the angle, or both from which the sensor 22 detected the object.

As yet another example, the electronic processor 34 determines a number of sensors that detected the dynamic object and determine the dynamic object existence probability based on the number of sensors. For example, a subset of the sensors 22 may have detected the dynamic object, and, in response a number of sensors included in the subset of the sensors 22 (or a percentage of the number of sensors out of a larger number of sensors) satisfying a threshold number of sensors, the electronic processor 34 may determine that the detected dynamic object has a high dynamic object existence probability. In contrast, in response to the number of sensors included in the subset of the sensors 22 not satisfying the threshold number of sensors, the electronic processor 34 may determine that the detected dynamic object has a low dynamic object existence probability.

As a further example, the electronic processor 34 may be configured to track the detected dynamic object over a period of time and, over the period of time, determine a plurality of dynamic object existence probabilities (e.g., for each of a plurality of measurement cycles), wherein the plurality of probabilities are used to determine the objects existence probability and classify the detected object as a real or non-real object. For example, based on the plurality of dynamic object existence probabilities determined over the period of time, the electronic processor 34 may determine a historical dynamic object existence probability associated with the detected dynamic object. For example, in response to the sensors 22 repeatedly detecting the dynamic object over many measurement cycles (e.g., greater than a threshold number of cycles), the electronic processor 34 may determine that the dynamic object existence probability for the detected dynamic object is high. In contrast, when the sensors 22 have not repeatedly detected the dynamic object over a predetermined number of measurement cycles, the electronic processor 34 determines that the dynamic object existence probability for the dynamic object is low.

As yet a further example, the electronic processor 34 may be configured to determine a dynamic object existence probability for a detected object based on an estimated a future trajectory, an estimated past trajectory, or both of the detected dynamic object determined based on a direction of motion and a travel speed of the detected object. For example, the electronic processor 34 may predict or retrodict the position of the dynamic object at certain time periods in the future, in the past, or both (e.g., ±0.1 seconds, ±0.5 seconds, ±1 second, etc.). Based on the estimated positions and associated trajectories, the electronic processor 34 determines an estimated overlap of the detected dynamic object in the static occupancy grid 42. The electronic processor 34 may then determine a plurality of dynamic object existence probabilities, wherein each probability is associated with a cell of the static occupancy grid 42 included in the estimated overlap. Each of the plurality of dynamic object existence probabilities may be based on the static occupancy probability associated with a respective cell.

The electronic processor 34 may apply a weight to reduce or increase a subset of the plurality of dynamic object existence probabilities associated with cells included in the estimated overlap. For example, the electronic processor 34 may increase the dynamic object existence probabilities associated with cells included in the estimated overlap to reduce the risk that a detected dynamic object is erroneously deplausibilized. In some instances, the weight is based on the time period of the estimated position, such that larger time periods result in a decreased magnitude of weighting applied to the plurality of dynamic object existence probabilities.

In some instances, the electronic processor 34 determines the dynamic object existence probability based on previous occupancy probabilities corresponding to static occupancy grid cells associated with the current position, the past position (e.g., a recorded previous position or an estimated previous position of the detected dynamic object), the future position (e.g., a position of the detected dynamic object recorded in the future or an estimated future position of the dynamic object), or a combination thereof of the detected dynamic object. For example, the electronic processor 34 may apply a weight to occupancy probabilities corresponding to static occupancy grid cells that recently transitioned from an unknown state or unobserved state to a known state.

In some instances, the electronic processor 34 applies a different weight to a subset of the plurality of dynamic object existence probabilities associated with a surface region of the detected dynamic object that faces the autonomous vehicle 10 than to a subset of the plurality of dynamic object existence probabilities associated with other regions of the detected dynamic object (e.g., other points, including 3D points, inside a dynamic object bounding box). For example, the sensors 22 may be more likely to detect a ghost dynamic object caused by the surface of a stationary object, such as, for example, a guard rail. By applying a different weight to the dynamic object existence probabilities corresponding to cells associated with the surface region of the detected dynamic object that faces the autonomous vehicle 10 relative to the dynamic object existence probabilities corresponding to cells associated with the other regions of the detected dynamic object, the electronic processor 34 may account for a possible erroneous detection of a dynamic object.

At block 76, after determining the dynamic object existence probability (using one or more of the examples described above), the electronic processor 34 determines whether the dynamic object existence probability is greater than a threshold existence probability. As noted above, in some instances, the electronic processor 34 determines that the dynamic object existence probability is greater than a threshold existence probability based on a plurality of dynamic object existence probabilities (e.g., based on a minimum, a maximum, or an average of a plurality of dynamic object existence probabilities).

In response to determining that the dynamic object existence probability is not greater than the threshold existence probability, the method 50 proceeds to block 80. At block 80, the electronic processor 34 classifies the detected dynamic object as a ghost dynamic object, indicating that the detected dynamic object does not represent a real dynamic object in the environment surrounding the autonomous vehicle 10. The electronic processor 34 may then deplausibilize or otherwise discard the dynamic occupancy information associated with the ghost dynamic object and control the autonomous vehicle 10 accordingly. For example, the dynamic occupancy information may be removed from the dynamic object list and the superposition of the detected dynamic object on the static occupancy grid 42 may be removed.

In contrast, in response to the electronic processor 34 determining, at block 76, the dynamic object existence probability is greater than a threshold, the method 50 proceeds to block 84. At block 84, based on the determination that the detected dynamic object has a sufficiently high likelihood of representing a real dynamic object in the environment, the electronic processor 34 classifies the static object as a ghost static object, which may be the result of a dynamic object leaving ghost static occupancy trails as it moves. Classifying the static object as a ghost static object, the electronic processor 34 may deplausibilize or otherwise discard the static occupancy information associated with the ghost static object and control the autonomous vehicle 10 accordingly. For example, the static occupancy information may be removed from the static occupancy grid 42.

Figure 5:
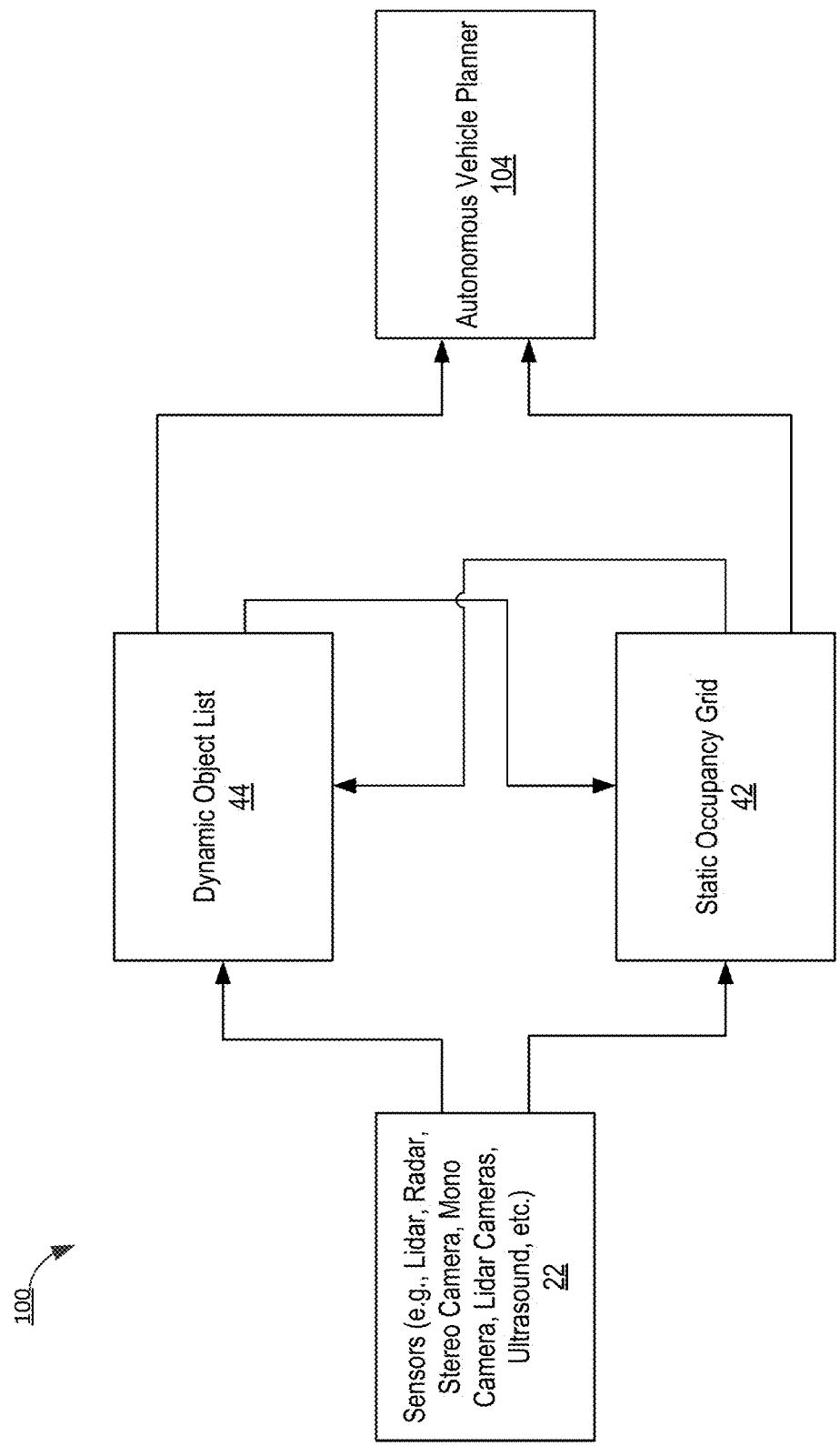
FIG. 5 illustrates an example sensor configuration for implementing the method of FIG. 3, according to some aspects.

FIG. 5 illustrates an example sensor configuration 100 for implementing the method 50. The sensor configuration 100 includes the sensors 22, for example lidar sensors, radar sensors, stereo cameras, mono-cameras, lidar cameras, ultrasonic sensors, or other suitable environment perceiving sensors. The sensor configuration 100 also includes the dynamic object list 44 for tracking detected dynamic objects 412, the static occupancy grid 42, and an autonomous vehicle planner 104 (e.g., the electronic processor 34 and the vehicle control systems 18 operable together to control movement of the autonomous vehicle 10).

The sensors 22 provide sensor data to both the static occupancy grid 42 and the dynamic object list 44, which, as described above, allows the electronic processor 34 to identify and track occupancy information related to detected static objects and detected dynamic objects 412. Information from the dynamic object list 44 is provided to the static occupancy grid 42 so that detected dynamic objects 412 may be superimposed on the static occupancy grid 42. Information relating to the result of the superimposition is provided from the static occupancy grid 42 to the dynamic object list 44, such as, for example, information related to the dynamic object existence probability determined by the electronic processor 34. The static occupancy grid 42 and the dynamic object list 44 may be updated based on the determination of the dynamic object existence probability (for example, as described with respect to block 80 or block 84). Information from both the static occupancy grid 42 and the dynamic object list 44 are then provided to the autonomous vehicle planner 104, which the autonomous vehicle planner 140 (the electronic processor 34) uses to control movement of the autonomous vehicle 10.

Thus, aspects herein provide systems and methods for identifying ghost objects.

What is claimed is:

1. A system for operating an autonomous vehicle, the system comprising:
    a sensor configured to output sensor data representative of a detected dynamic object,
    an electronic processor configured to:
        receive a static occupancy grid, the static occupancy grid including a plurality of cells, a subset of the cells storing occupancy information and occupancy probabilities associated with a static object in the environment,
        generate a dynamic object list, the dynamic object list including dynamic object information associated with the detected dynamic object and a respective position of the detected dynamic object in the environment,
        superimpose a representation of the detected dynamic object on the static occupancy grid based on the dynamic object information,
        generate a dynamic object perimeter based on a shape of the detected dynamic object as superimposed on the static occupancy grid,
        determine, based on the dynamic object perimeter, an overlap of the detected dynamic object and the static object represented in the static occupancy grid,
        determine a dynamic object existence probability associated with the detected dynamic object based at least on the overlap,
        classify the detected dynamic object as a ghost dynamic object in response to determining the dynamic object existence probability is less than a threshold, and
        control vehicle motion based on the classification of the detected dynamic object as a ghost dynamic object.

2. The system of claim 1, wherein the electronic processor is further configured to, in response to the dynamic object existence probability being greater than the threshold, classify the static object as a ghost static object.

3. The system of claim 1, wherein the electronic processor is configured to determine the dynamic object existence probability by
    determining a modality of the sensor, and
    determining the dynamic object existence probability based on the modality of the sensor.

4. The system of claim 1, wherein the electronic processor is configured to determine the dynamic object existence probability by
    determining a size of the detected dynamic object, and
    determining the dynamic object existence probability based on the size of the detected dynamic object.

5. The system of claim 1, wherein
    the system includes a plurality of sensors configured to detect the dynamic object, and
    the electronic processor is configured to determine the dynamic object existence probability by
        determining a number of sensors that detected the dynamic object, and
        determining the dynamic object existence probability based on the number of sensors that detected the dynamic object.

6. The system of claim 1, wherein the electronic processor is configured to determine the dynamic object existence probability by
    tracking the detected dynamic object over a period of time,
    determining a plurality of dynamic object existence probabilities over the period of time, and
    determining a historical dynamic object existence probability associated with the detected dynamic object based on the plurality of dynamic object existence probabilities.

7. The system for an autonomous vehicle of claim 1, wherein the electronic processor is configured to determine the dynamic object existence probability by
    determining a direction of motion of the detected dynamic object,
    determining a plurality of dynamic object existence probabilities, each associated with a cell of the static occupancy grid included in the overlap, and
    applying a weight to a subset of the plurality of dynamic object existence probabilities based on the direction of motion.

8. The system for an autonomous vehicle of claim 1, wherein the electronic processor is configured to superimpose the dynamic object information on the static occupancy grid by
    predicting or retrodicting the dynamic object information such that a time stamp associated with the dynamic object information matches a time stamp associated with the static occupancy grid, and
    spatially transforming the dynamic object information.

9. The system for an autonomous vehicle of claim 1, wherein the plurality of cells of the static occupancy grid are voxels, and the dynamic object perimeter is a 3D bounding box.

10. A method for operating an autonomous vehicle, the method comprising:
    outputting, with a sensor, sensor data representative of a detected dynamic object;
    receiving, with an electronic processor, a static occupancy grid, the static occupancy grid including a plurality of cells, a subset of the cells storing occupancy information and occupancy probabilities associated with a static object in the environment;
    generating a dynamic object list, the dynamic object list including dynamic object information associated with the detected dynamic object and a respective position of the detected dynamic object in the environment;

superimposing a representation of the detected dynamic object on the static occupancy grid based on the dynamic object information;

generating a dynamic object perimeter based on a shape of the detected dynamic object as superimposed on the static occupancy grid;

determining, based on the dynamic object perimeter, an overlap of the detected dynamic object and the static object represented in the static occupancy grid;

determining a dynamic object existence probability associated with the detected dynamic object based at least on the overlap;

classifying the detected dynamic object as a ghost dynamic object in response to determining the dynamic object existence probability is less than a threshold; and controlling vehicle motion based on the classification of the detected dynamic object as a ghost dynamic object.

11. The method of claim 10, further comprising in response to the dynamic object existence probability being greater than the threshold, classifying the static object as a ghost static object.

12. The method of claim 10, wherein determining the dynamic object existence probability includes determining a modality of the sensor, and determining the dynamic object existence probability based on the modality of the sensor.

13. The method of claim 10, wherein determining the dynamic object existence probability includes determining a size of the detected dynamic object, and determining the dynamic object existence probability based on the size of the detected dynamic object.

14. The method of claim 10, further comprising detecting the dynamic object with a plurality of sensors, and wherein determining the dynamic object existence probability includes determining a number of sensors that detected the dynamic object, and determining the dynamic object existence probability based on the number of sensors that detected the dynamic object.

15. The method of claim 10, wherein determining the dynamic object existence probability includes tracking the detected dynamic object over a period of time, determining a plurality of dynamic object existence probabilities over the period of time, and determining a historical dynamic object existence probability associated with the detected dynamic object based on the plurality of dynamic object existence probabilities.

16. The method of claim 10, wherein determining the dynamic object existence probability includes determining a direction of motion of the detected dynamic object, determining a plurality of dynamic object existence probabilities, each associated with a cell of the static occupancy grid included in the overlap, and applying a weight to a subset of the plurality of dynamic object existence probabilities based on the direction of motion.

17. The method of claim 10, wherein superimposing the dynamic object information on the static occupancy grid includes predicting or retrodicting the dynamic object information such that a time stamp associated with the dynamic object information matches a time stamp associated with the static occupancy grid, and spatially transforming the dynamic object information.

18. The method of claim 10, wherein the plurality of cells of the static occupancy grid are voxels, and the dynamic object perimeter is a 3D bounding box.

* * * * *